(12) United States Patent  
Lecoq

(10) Patent No.: US 7,066,363 B2  
(45) Date of Patent: Jun. 27, 2006

(54) STEERING COLUMN MOUNTED COOLER TRAY

(76) Inventor: Pierre G. A. Lecoq, 1803 Lennox Rd. East, Palm Harbor, FL (US) 34683

( * ) Notice: Subject to any disclaimer, the term of this patent is extended or adjusted under 35 U.S.C. 154(b) by 351 days.

(21) Appl. No.: 10/730,718

(22) Filed: Dec. 8, 2003

(65) Prior Publication Data

US 2004/0113397 A1 Jun. 17, 2004

Related U.S. Application Data

(60) Provisional application No. 60/434,233, filed on Dec. 17, 2002.

(51) Int. Cl.
*B60R 7/00* (2006.01)
*B60R 9/00* (2006.01)
*B62J 7/00* (2006.01)

(52) U.S. Cl. ............ 224/276; 224/274; 224/441; 224/547; 224/558; 224/42.32

(58) Field of Classification Search ............ 224/276, 224/274, 441, 545, 566, 565, 42.33, 42.32, 224/558, 547, 585, 279, 278; 470/3, 49; 220/475, 555; 248/219.1
See application file for complete search history.

(56) References Cited

U.S. PATENT DOCUMENTS

| 1,567,903 | A | * | 12/1925 | Bookman | 224/276 |
| 4,836,403 | A | * | 6/1989 | Blackmon | 220/737 |
| 5,419,478 | A | * | 5/1995 | Mauro et al. | 224/276 |
| 6,116,266 | A | * | 9/2000 | Dickison et al. | 137/312 |
| 6,408,790 | B1 | * | 6/2002 | Maguire | 119/166 |

* cited by examiner

*Primary Examiner*—Jes F. Pascua

*Assistant Examiner*—Lester L. Vanterpool

(74) *Attorney, Agent, or Firm*—Dennis G. LaPointe

(57) ABSTRACT

The specification and drawings describe and show the present invention in the form of a tray designed to accommodate the snug installation of an associated or desired cooler. The tray is further designed to be installed on the steering column of a vehicle, such as a golf cart vehicle. Optionally, the upstanding side walls and front wall of the tray portion can have drink holders.

6 Claims, 12 Drawing Sheets

STEERING COLUMN MOUNTED COOLER TRAY

This application claims the benefit of U.S. Provisional Application No. 60/434,233 Filing Date Dec. 17, 2002.

The invention relates to a tray mounted to a steering wheel column of a golf cart for mounting and securing a cooler containing beverages or other food items.

The cooler tray is an innovative device designed specifically to fit or accept a cooler exclusively, and preferably a cooler associated with a specific brand name. For example, if the end user is using a "Igloo Legend 12" cooler, then the tray is designed to receive only that specific cooler. The intent is that a golf course, can prevent golfers from bringing their own coolers and beverages on a course. However, if a golfer desires, he can pay a deposit to rent a specific cooler partially filled with ice or ice blocks that snugly fits into the golf cart vehicle steering mounted tray.

Golfer's can then order their food items and beverages and keep them cool in the cooler inserted into the tray.

The tray is typically made from polymeric materials such as plastic base materials or fiber-reinforced polymeric compositions. The fasteners can be made from any materials, including polymeric materials, steel, brass etc.

Figure 1:
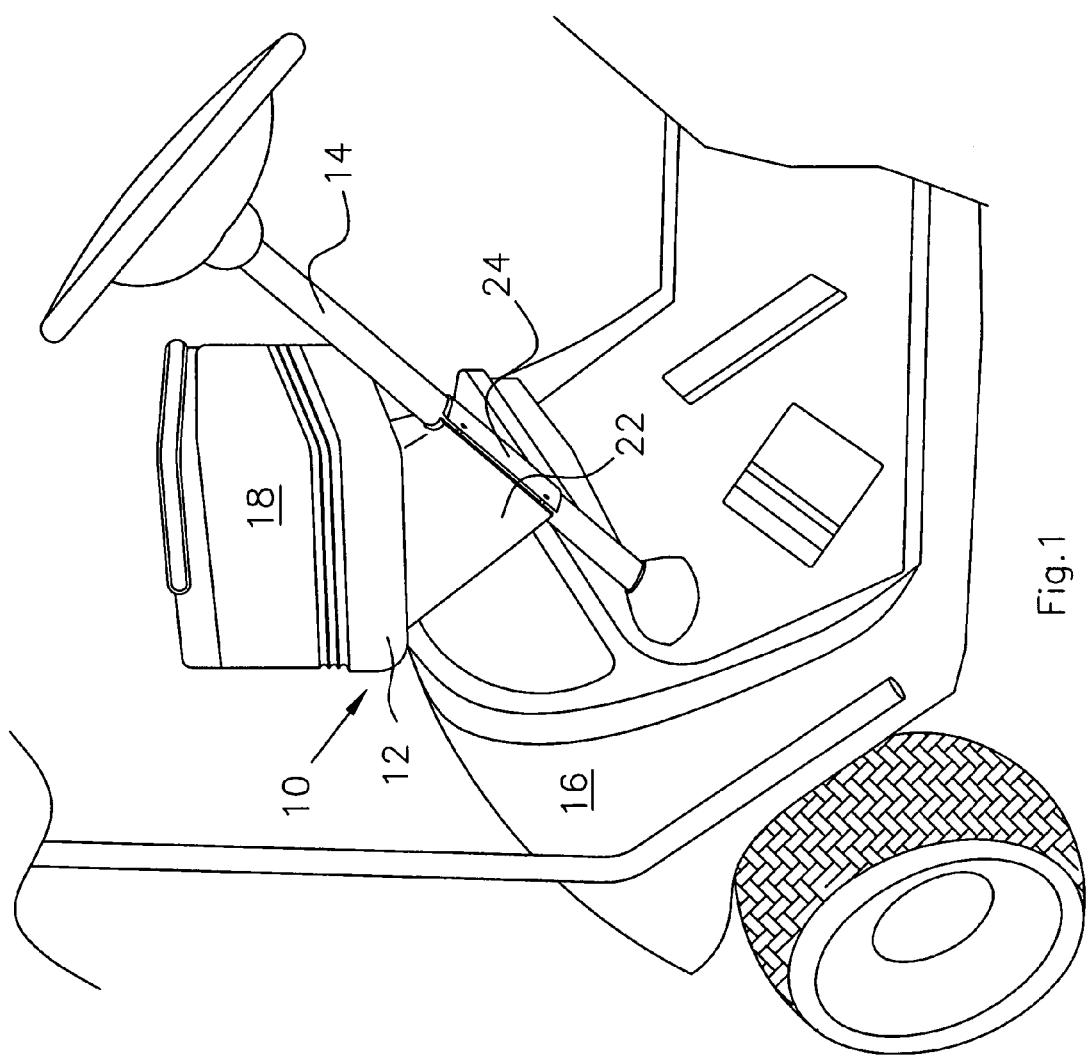
FIG. 1 is an illustration of the inventive tray mounted to a golf cart steering wheel column with a cooler inserted in the tray.
Figure 2:
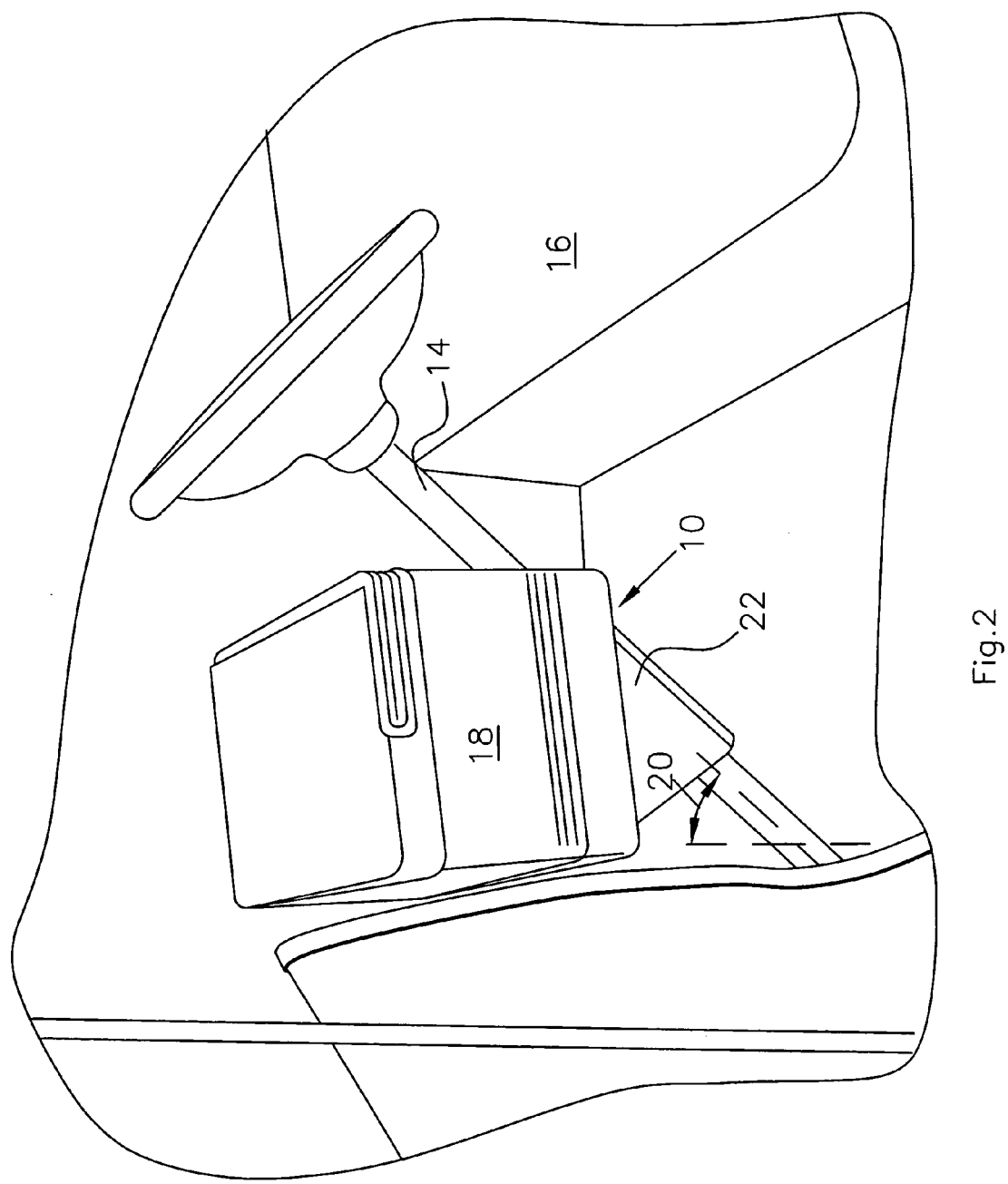
FIG. 2 is another illustration similar to that of FIG. 1.
Figure 3:
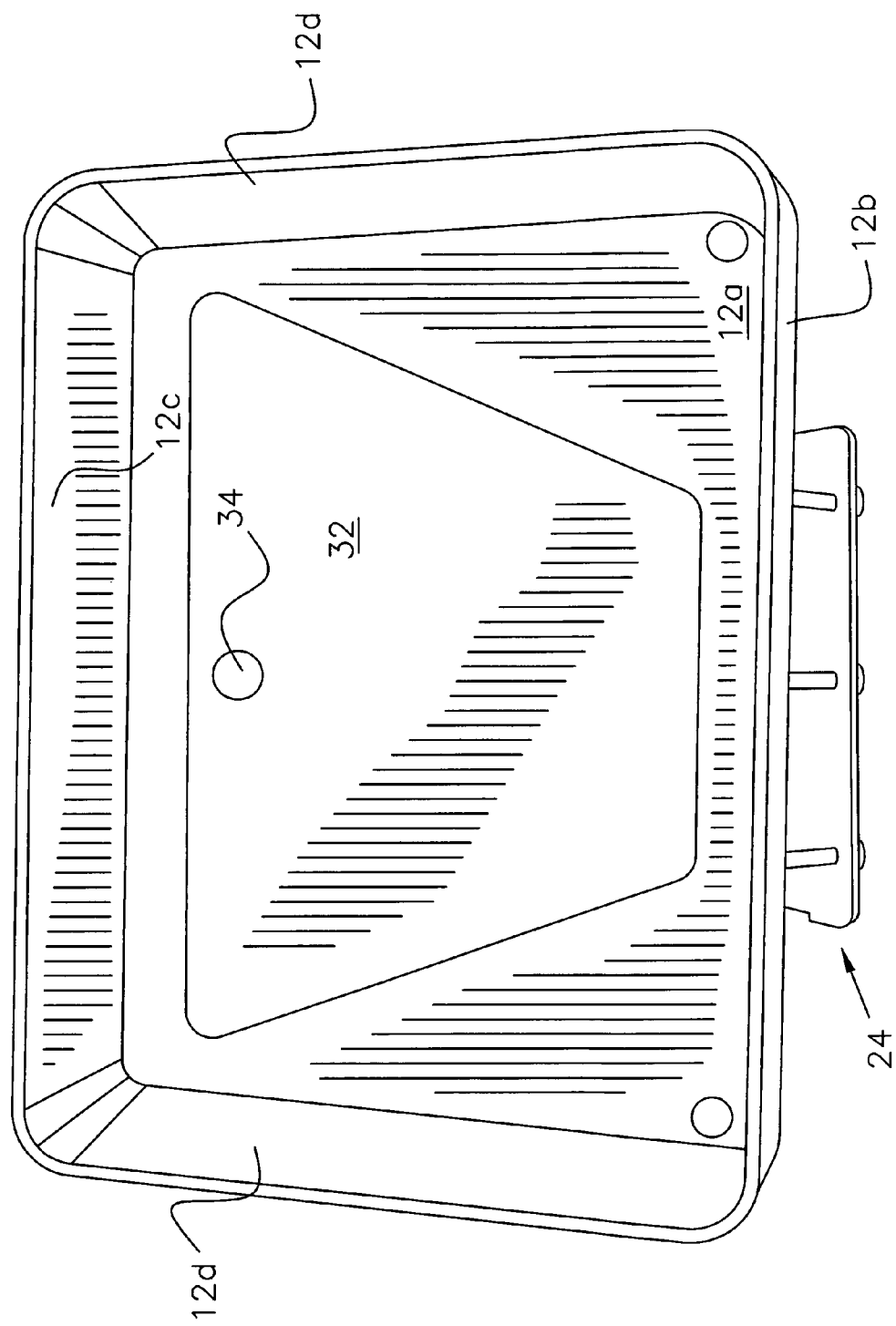
FIG. 3 is an illustration of the inside of the tray, including the temporary inside cover with a finger hole for removing the cover to gain access to the inside hollow recessed portion.
Figure 4:
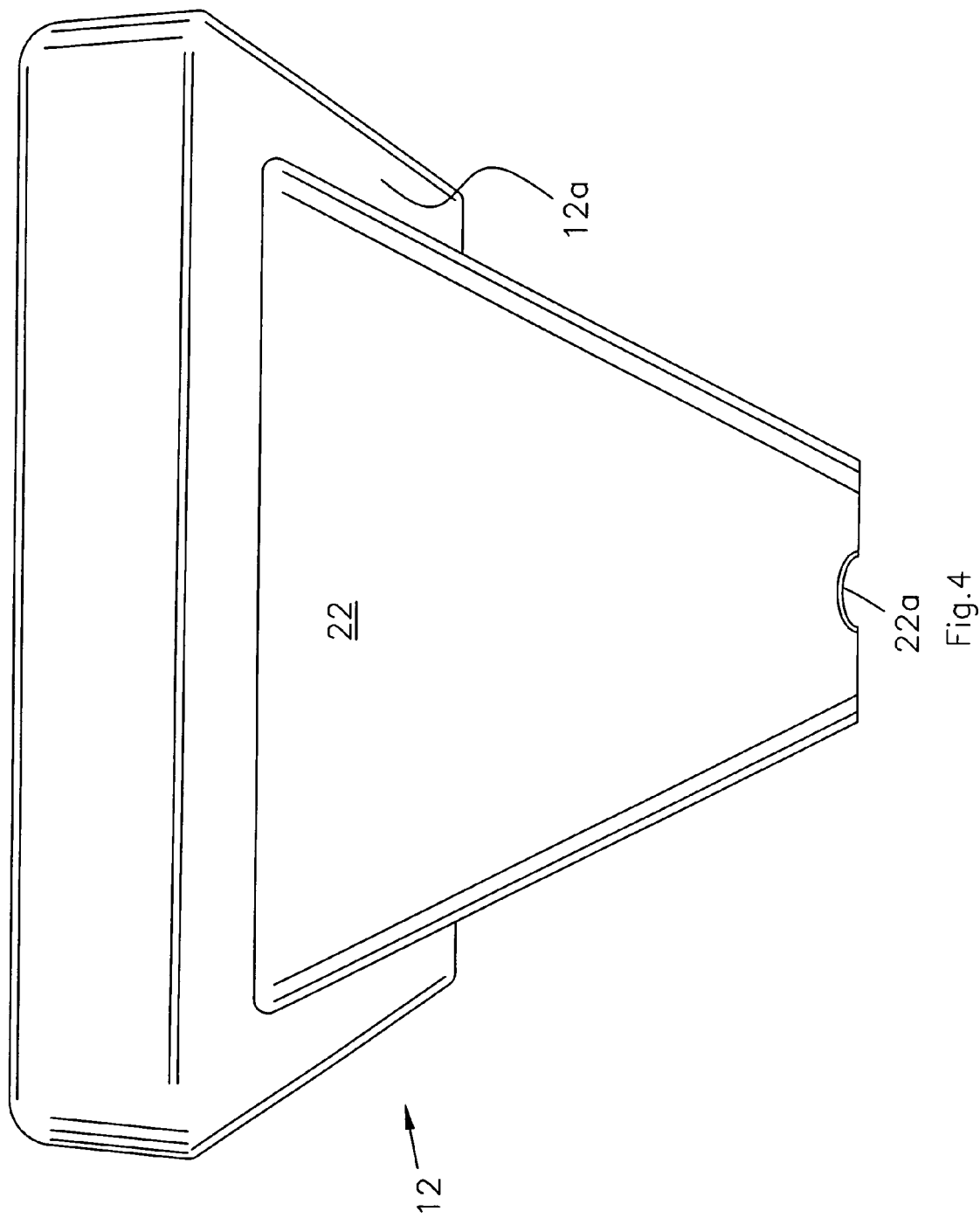
FIG. 4 is an illustration of a back side (side closest to dash board) view of the tray.
Figure 5:
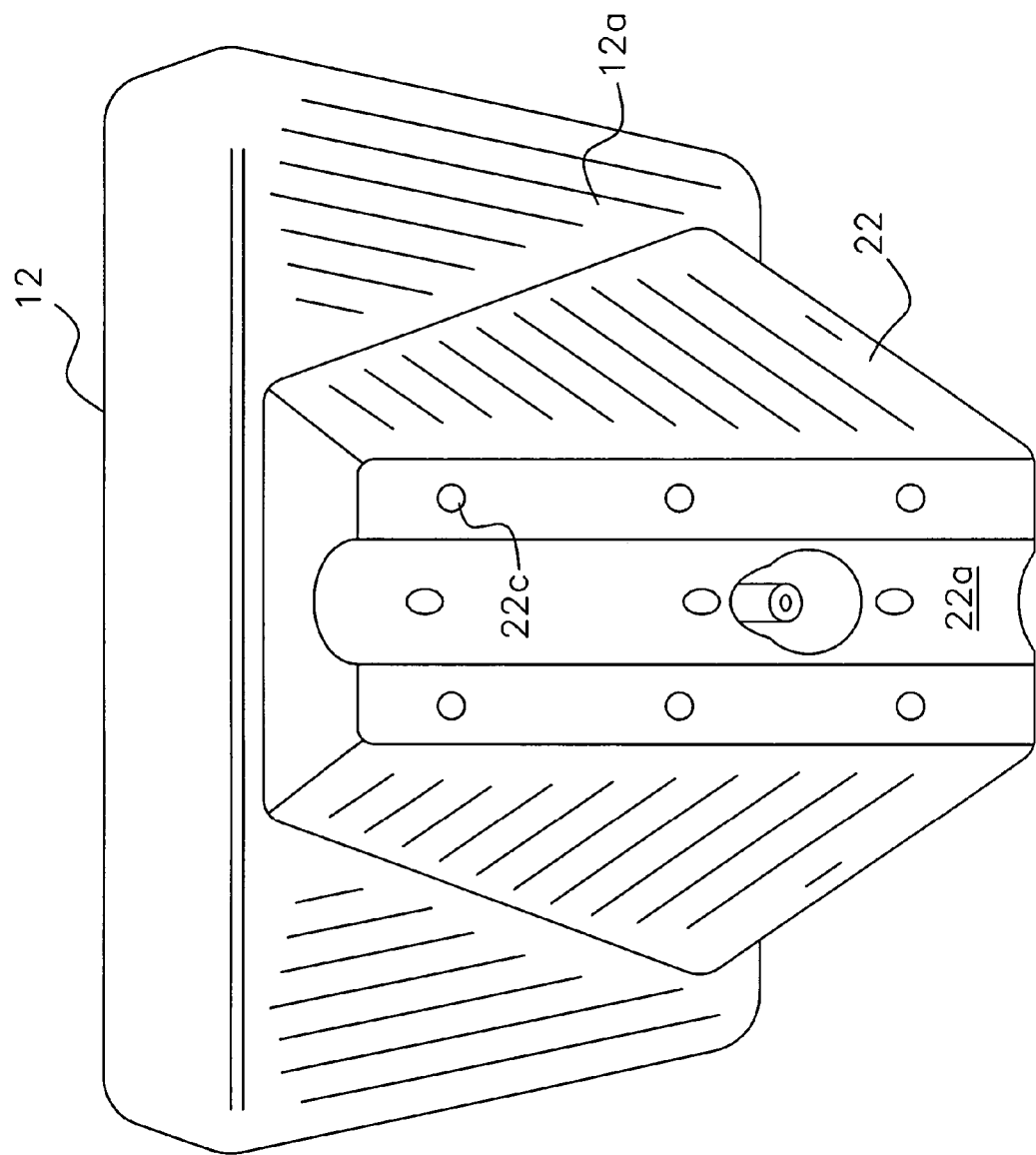
FIG. 5 is an illustration of the bottom view of the tray depicting the steering column mounting features.

Referring now to FIGS. 1–12, the invention, depicted generally as 10, is a tray 12 adapted to be mounted on the steering column 14 of a vehicle 16, particularly, a golf cart vehicle, comprising:

a tray 12 having a bottom wall portion 12a and a front wall portion 12b, a rear wall portion 12c, and a pair of side walls 12d, said tray 12 defining a receiver for the secure insertion of a bottom portion of a cooler 18;

the vehicle 16 having an exposed steering column 14, said steering column 14 being disposed at a predetermined angle of inclination 20 relative to a vertical plane;

the tray 12 further comprising a steering column mounting portion 22 having a steering column-receiving channel 22a formed under said bottom wall portion 12a in said steering column mounting portion 22;

said steering column-receiving channel 22a being formed substantially in the center of said steering column mounting portion 22;

said steering column-receiving channel 22a being formed at a predetermined angle relative to said vertical plane when said bottom wall portion is disposed in a substantially parallel relationship to a horizontal plane, said predetermined angle being substantially equal to the predetermined angle of inclination of said steering column 14; and attachment means 24 for attaching the tray 12 to said steering column 14 and for positioning said bottom wall portion 12a of said tray 12 in said substantially parallel relationship to said horizontal plane when so attached, wherein the tray 12 is formed and dimensioned between the front wall portion 12b, the rear wall portion 12c and the side wall portions 12d to receive an associated cooler 18, which will snugly fit into said tray 12.

A typical example of an attachment means 24 is one that comprises:

a bracket assembly 26 having an elongate portion 26a which includes a longitudinal semi-circular portion 26b that engages the steering wheel column 14 in a sandwiched relation with the steering wheel column-receiving channel 22a; and the bracket assembly 26 further including a flange portion 26c on each side of the longitudinal semi-circular portion 26b with a plurality of spaced-apart apertures 26d for inserting fasteners 26e to secure the tray 12 to the steering column 14.

As shown in FIGS. 8–11, in this type of design attachment, it is preferred that the bracket assembly 26 further comprises:

two elongate members 26f, each having a plurality of spaced-apart apertures 26g corresponding to the apertures 26d in the flange portions 26c, the elongate members 26f formed to be placed inside a hollow recessed portion 22b formed in the steering column mounting portion 22 of the tray 12, so as to act as a washer and spacer between a fastener nut 26h and a surface of the hollow portion 22b of the steering column mounting portion 22.

Figure 9:
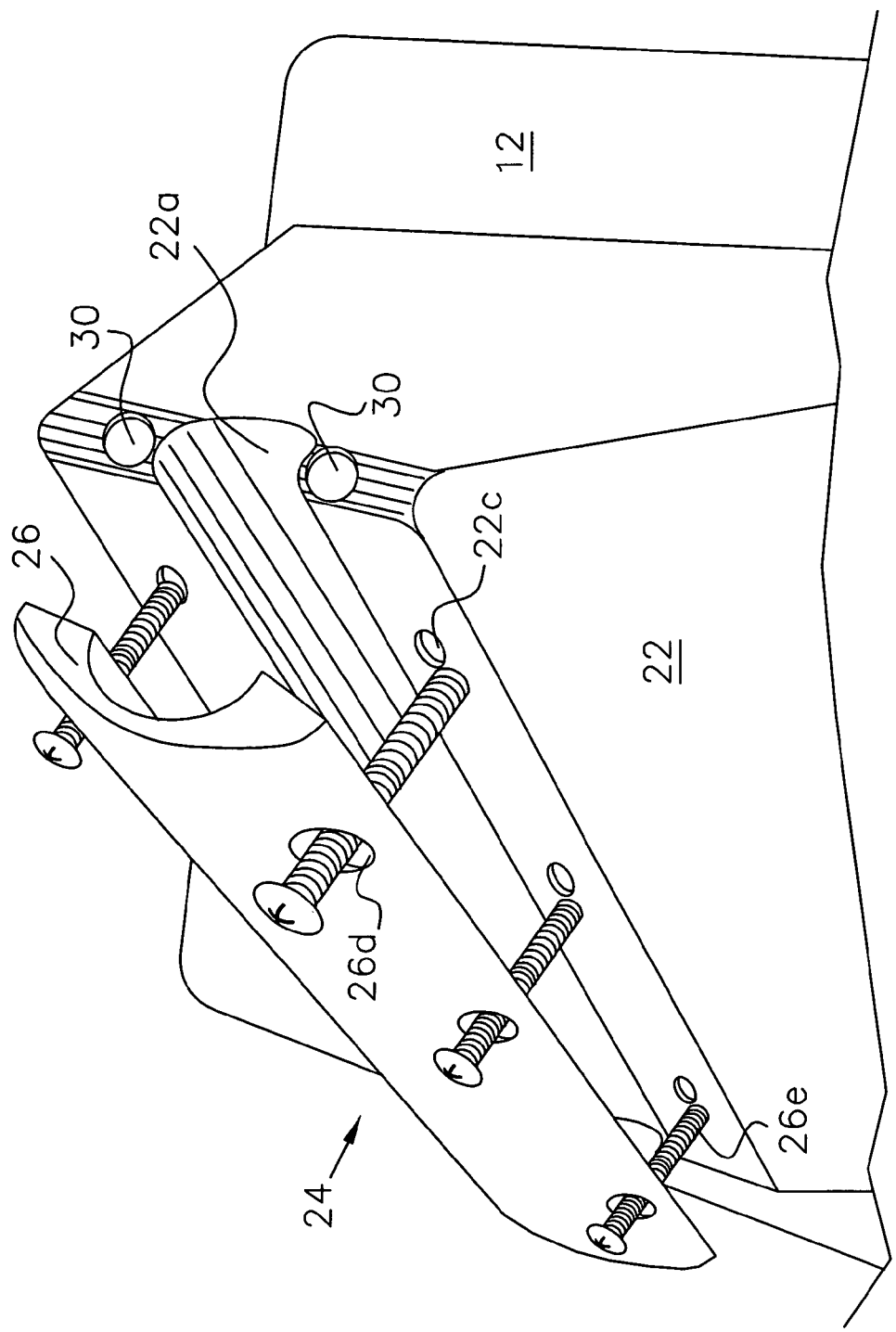
FIG. 9 is an illustration a portion of the steering column bracket assembly with the bolts protruding through the apertures in the flange portion into the apertures of the tray portion and the illustration also depicts the drain holes at the most bottom interior portion of the tray's recessed hollow portion.
Figure 10:
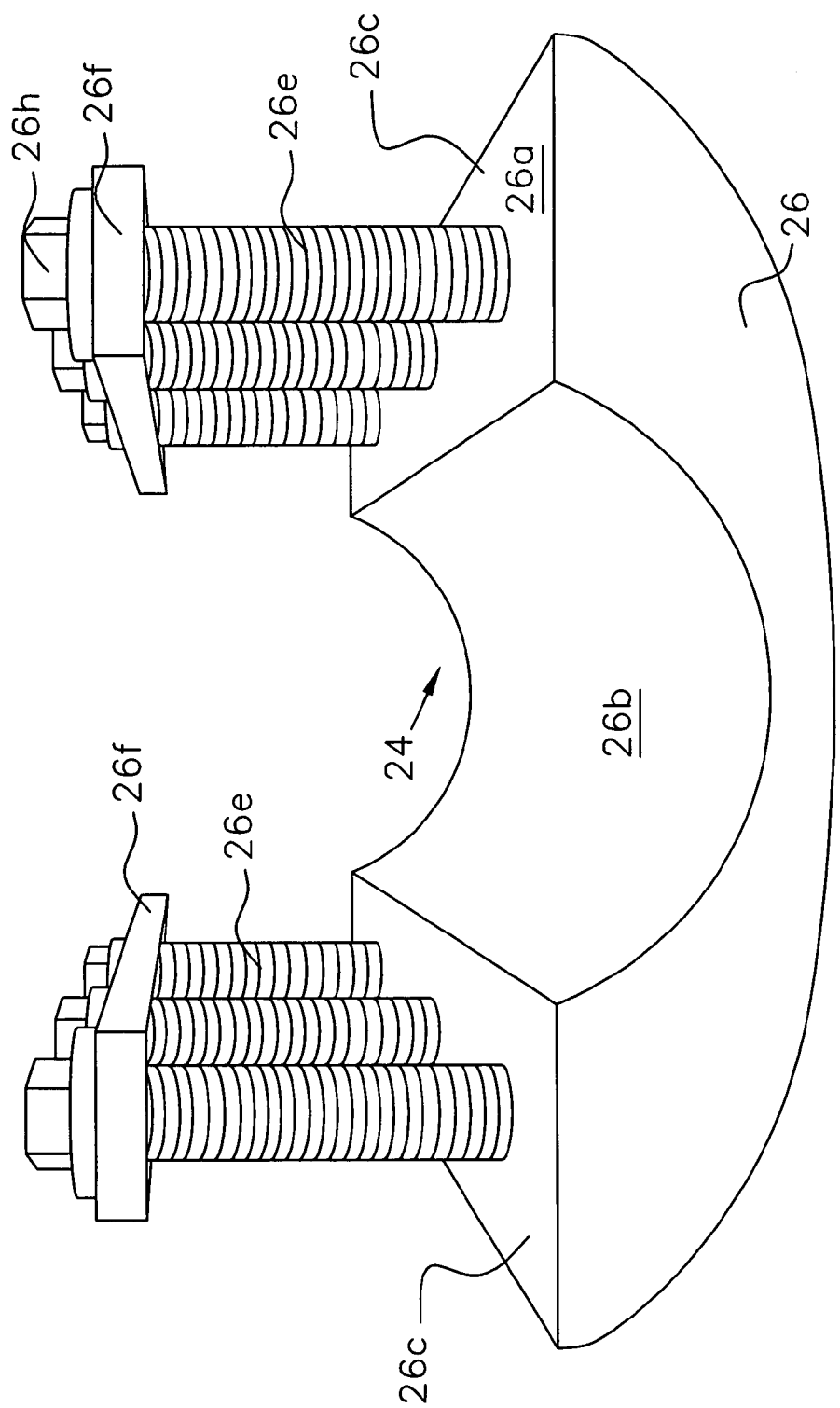
FIG. 10 is an illustration depicting an end view of the bracket assembly.
Figure 11:
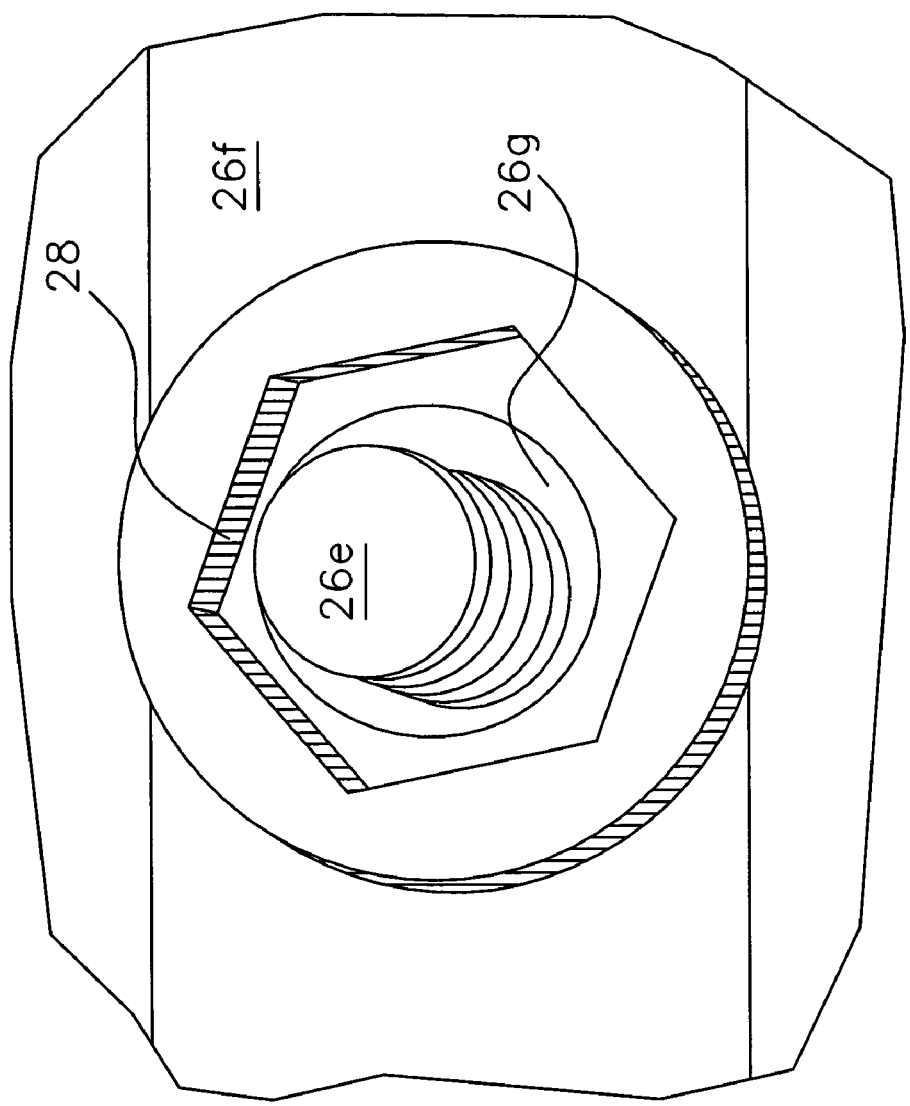
FIG. 11 is an illustration depicting the nut holding feature incorporated into the spacer/washer elongate member.

The two elongate members 26f each have aligned with the spaced-apart apertures 26g, fastener nut recessed securement means 28 formed to the shape of the fastener nut 26h for holding each fastener nut 26h in place when tightening each fastener bolt 26e used to secure the tray 12 to the steering column 14. FIG. 9 is an illustration a portion of the steering column bracket assembly 26 with the bolts or fasteners 26e protruding through the apertures 26c in the flange portion into the apertures 22c of the tray portion 12, particularly, the recessed hollow portion 22b and the illustration also depicts the drain holes 30 at the most bottom interior portion of the tray's recessed hollow portion 22b. It is preferred that at least one drain hole 30 be located at a bottom of the hollow portion 22b. FIG. 9 depicts two holes for illustration purposes.

Figure 6:
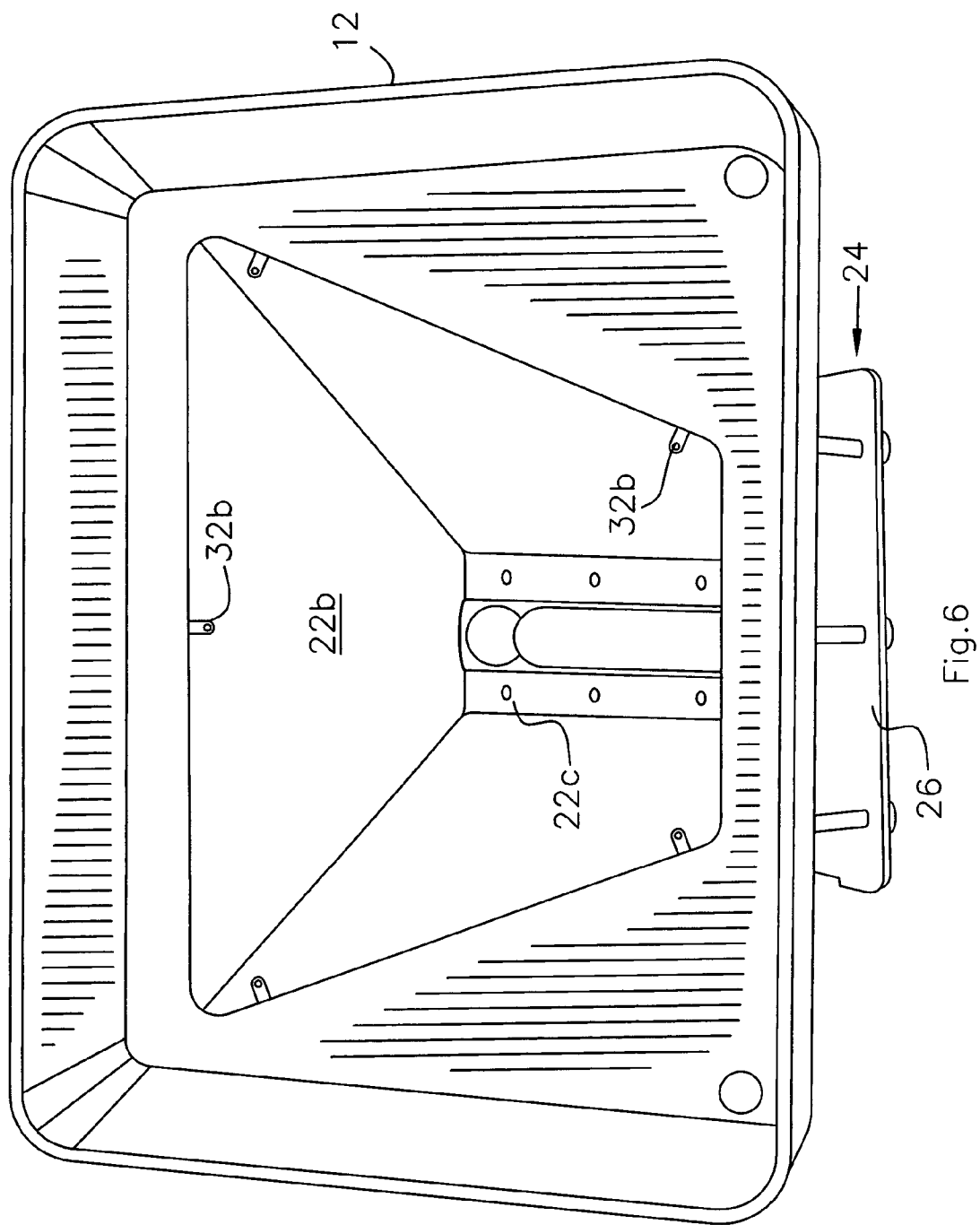
FIG. 6 is an illustration similar to that of FIG. 3, with the temporary cover removed.
Figure 7:
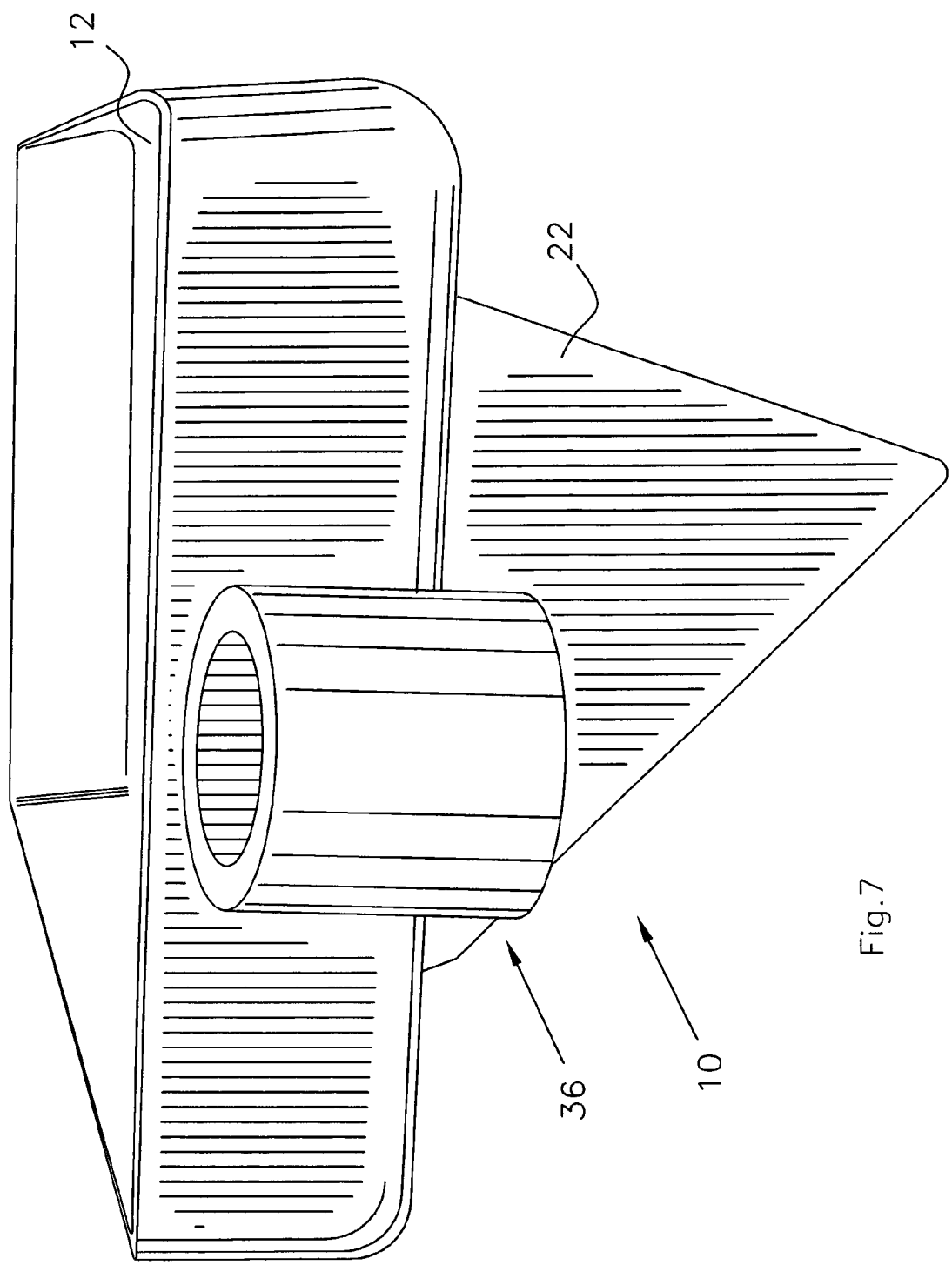
FIG. 7 is an illustration of a side view of the tray indicating that optional beverage holders can be included.
Figure 8:
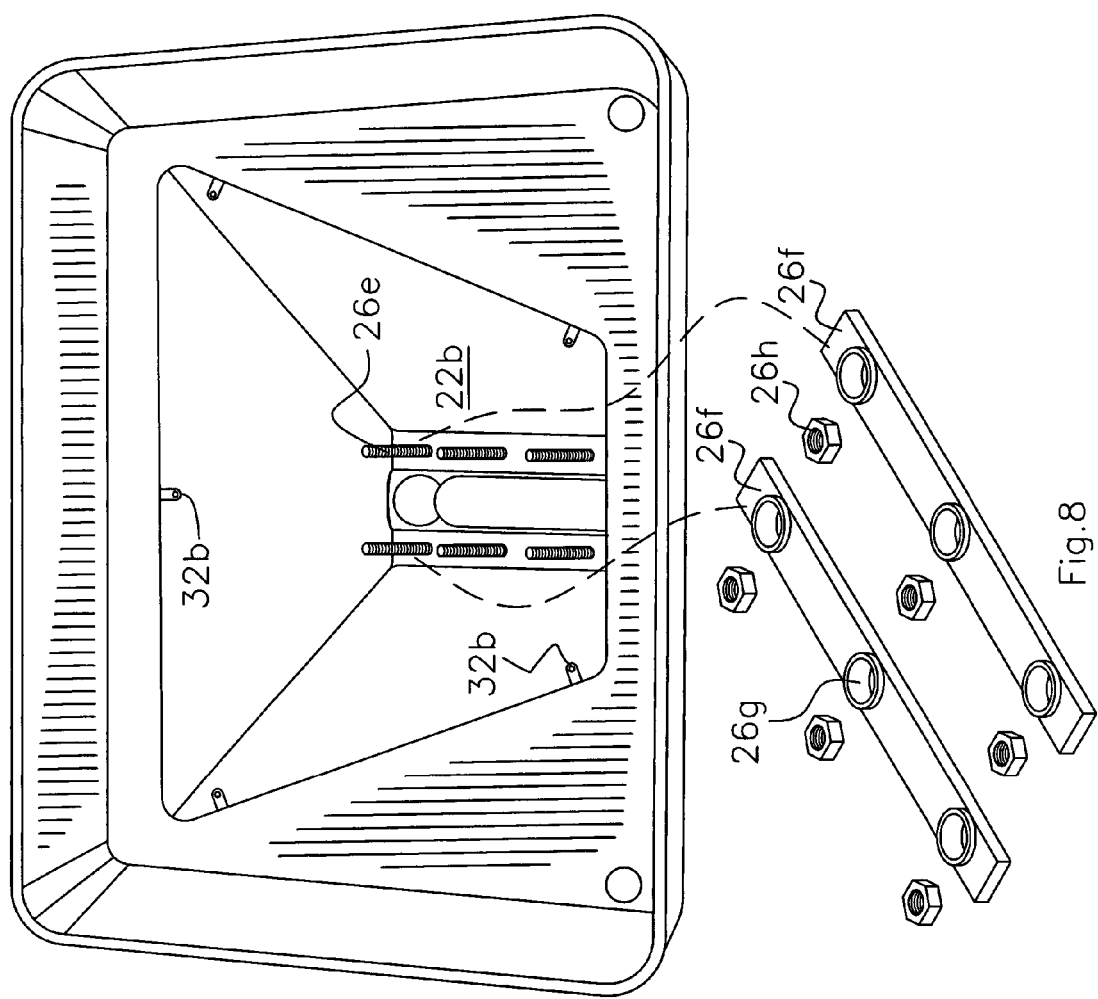
FIG. 8 is an illustration of the interior of the tray together the bolts protruding into the tray interior, the spacer elongate members and the nuts.
Figure 12:
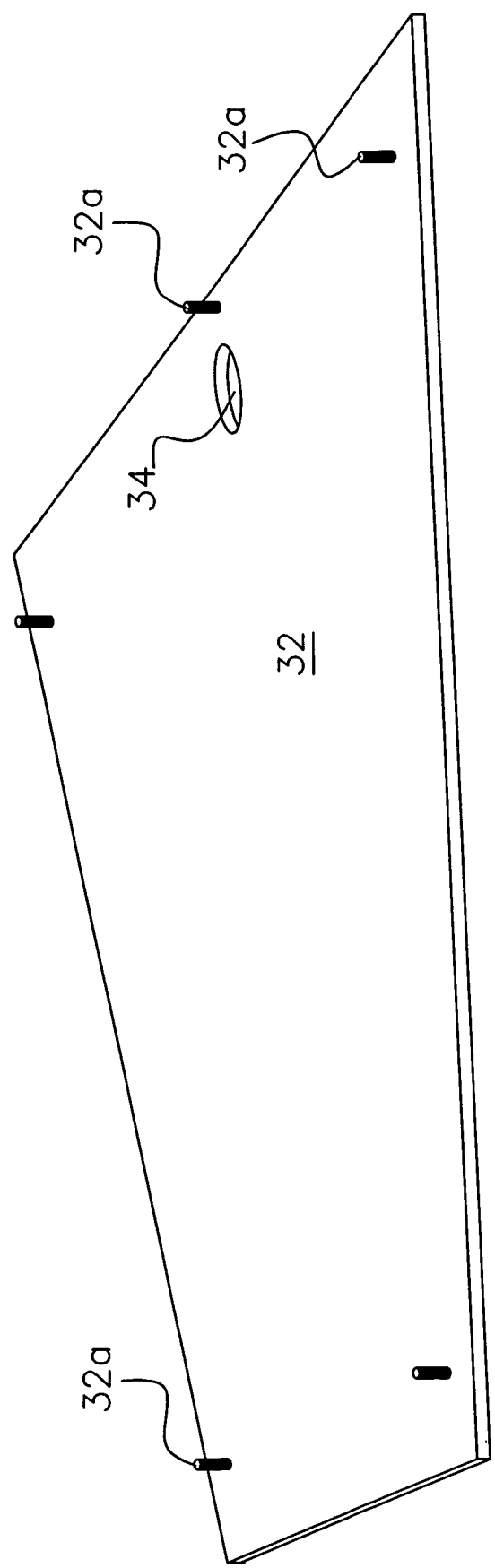
FIG. 12 is a depiction of tabs extending from a perimeter of the inside surface of the temporary cover, the tabs being designed to interlock with corresponding receiving portions as depicted in FIG. 6.

FIG. 12 is a depiction of tabs 32a extending from a perimeter of the inside surface of the temporary cover 32, the tabs 32a are designed to interlock with corresponding receiving portions 32b as depicted in FIGS. 6 and 8. This temporary or removable cover 32, which is located on the bottom wall portion 12a of the tray 12, is suggested for access to the threaded portion of the bolts and nuts when such a fastener is used. Of course, the underneath portion of the tray 12 could be solid polymer with female threads formed in the polymer into which, the bolts would fasten without the use of nuts. When a cover 32 is used, the cover 32 should have means 34 for temporarily removing said cover 32 to gain access to the inside of the hollow portion 22b, such as a simple finger hole or an indented ridge portion or tab portion. A finger hole is shown for illustrative example purposes in FIGS. 3 and 12.

It may also be desirable to incorporate at least one drink holder means 36 attached to an external wall surface of one of the front wall portion 12b, the pair of side wall portions 12d and combinations thereof. Such drink holders can be designed in a variety of designs, can be attached integrally to the tray upstanding walls on the side walls or on the front wall, the side facing the driver of the vehicle. The holders can also be attached by rivets or other mechanical means known in the art. These are not shown in the drawings as they are merely examples of attachment means.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

The following is a brief description of the use of the invention as compared to other methods or devices currently in use. Coolers, for the most part, when mounted on a golf car are set into a (metal) wire basket that is fastened at the rear of the golf car, unless it is a cooler similar to that described in U.S. Pat. No. 5,419,478 (a steering wheel mounted cooler). The problem with mounting wire baskets at the back of golf cars is primarily one of space constraints. There is a limited amount of space from the standpoint that a number of other cart accessories are competing for this limited space. Other cart accessories would include sweater baskets, Club & Ballwashers, and sand bottles/buckets that are used to repair divots on the fairways (Bermuda/Bent grass). The above mentioned steering wheel column mounted cooler patented by the inventor herein and co-inventor Mauro, does have some shortcomings regarding the bracket assembly. If not properly installed or if the tightness of the bolts is not monitored and maintained, the cooler will then to twist. The present invention includes significant more surface contact of the bracket assembly design with the steering wheel column, that is, about 8 inches as opposed to about 1½ inches in surface contact length by the bracket portion.

The principal benefits of a steering column mounted Cooler Tray are twofold:

a cooler tray relieves accessory/space congestion at the rear/back of the golf car; and a cooler tray permits ready access to the cooler for both the driver and passenger. The need to stop and exit the vehicle in order to access the cooler has been effectively eliminated. There are benefits for a golf course to incorporate a cooler tray system in its operations. For purposes of exemplary discussion, the following assumptions are made:

1. The golf course has a rental fleet of "x" number of golf cars;

2. All "x" number of golf cars are equipped with a cooler tray;

3. The course purchases "x" number of coolers like the "Igloo Legend 12" coolers and stores them at the course concession stand where food/snack and beverages are dispensed to golfers for consumption primarily during their round of golf on the course. These coolers, for the most part, are custom imprinted with the name and logo of the course on a 3½ by 10 inch imprint area located on the front of the cooler.

When golfers arrive at the course, their first stop is to check into the pro shop in order to pay their "Greens & Cart Rental Fees" whereupon they exit the pro shop with the key to a cart. After loading their golf bags etc. onto the cart and prior to heading to the first tee, they swing by the concession stand where they purchase food and beverages for consumption on the front nine (9) holes of the course. Upon paying for these items, the concession stand employee issues the golfer(s) an ice and beverage-filled cooler, which the golfer(s) readily set securely into the waiting cooler tray. The golfer(s) play the front nine (9) and swing back by the concession stand to reload for the back nine (9). At the conclusion of the round, the golfer(s) return the cart to the cart barn, where a waiting cart attendant cleans both the cart and cooler before returning the cooler to the concession stand to be recycled back into the system. Depending upon the caliber of the course, in order to prevent cooler theft, the concession stand employee can demand that golfers submit a credit card or Driver's License as a security deposit to be returned upon surrender of the cooler at the conclusion of the round. To prevent golfers from using their own coolers, if the cooler isn't sporting the custom imprinted course name and logo or is of a different color, then the course ranger will know automatically that this is a rogue cooler in violation of course policy, whereupon the ranger takes the appropriate measures to terminate such action.

Where courses have their own beverage carts, the cooler tray system compliments and does not compete against it. A key benefit is that the course will sell more beverages with the cooler tray system. Whether beverages are purchased at the concession stand or from an ever roving beverage cart, golfers are reluctant to purchase more than two (2) beverages at a time because when beverages are set in the drink holders located on the dashboard of a golf car, they tend to get warm rather quickly due to the heat, and suddenly they're no longer refreshing. With the cooler tray system, golfers can purchase as many as twelve (12) beverages at one time. In short, the cooler tray system could best be described as a potential highly lucrative and efficient beverage delivery system for golf courses.

It is anticipated that instead of ice, courses would use "Freezer Packs" for the cooler. By substituting a Freezer Pack for ice (cubes), the potential for water to escape from the cooler in the event the cart either hits a bump or makes a quick, sharp turn is effectively eliminated.

Now that the invention has been described,

What is claimed is:

1. A tray adapted to be mounted on the steering column of a golf cart vehicle for holding a conventional cooler, the tray comprising:

a tray having a bottom inside surface having a corresponding width and depth corresponding to an approximate outside bottom width and depth of a cooler intended to be inserted in said tray and to rest on said bottom inside surface, the tray further having a front wall portion, a rear wall portion, and a pair of side wall portions, each of said front and rear wall portions and side wall portions extending in a generally upright direction to a predetermined height above the bottom inside surface and being contiguous with each adjacent wall portion and the bottom inside surface of said tray wherein said wall portions further define a generally hollow receiver for the unfastened insertion of a cooler;

the vehicle having an exposed steering column, said steering column being disposed at a predetermined angle of inclination relative to a vertical plane;

the tray further comprising a steering column mounting portion having a steering column-receiving channel formed under said bottom inside surface in said steering column mounting portion;

said steering column-receiving channel being formed substantially in the center of said steering column mounting portion;

said steering column-receiving channel being formed at a predetermined angle relative to said vertical plane when said bottom inside surface is disposed in a substantially parallel relationship to a horizontal plane, said predetermined angle being substantially equal to the predetermined angle of inclination of said steering column; and a bracket assembly for attaching the tray to said steering column and for positioning said bottom inside surface of said tray in said substantially parallel relationship to said horizontal plane when so attached, the bracket assembly having an elongate portion having a length in relation to a front to rear depth of the bottom inside surface of the tray generally approximating said front to rear depth of the bottom inside surface of the tray, said elongate portion further including a longitudinal semi-circular portion that engages the steering wheel column in a sandwiched relation with the steering wheel column-receiving channel, the bracket assembly further including a flange portion on each side of the longitudinal semi-circular portion with a plurality of spaced-apart apertures for inserting fasteners to secure the tray to the steering column, wherein the bracket assembly is configured to clamp to an underneath portion of the steering column and the fasteners are insertable through the spaced-apart apertures of the flange portions for securing the tray to the steering column;

wherein the tray is formed and dimensioned between the front wall portion, the rear wall portion and the side wall portions to receive said cooler, which will snugly fit into said tray.

2. The tray according to claim 1, wherein the bracket assembly further comprises:

two elongate members, each having a plurality of spaced-apart apertures corresponding to the apertures in the flange portions, the elongate members formed to be placed inside a hollow recessed portion formed in the steering column mounting portion of the tray, so as to act as a washer and spacer between a fastener nut and a surface of the hollow portion of the steering column mounting portion.

3. The tray according to claim 2, wherein the two elongate members each have aligned with the spaced-apart apertures, fastener nut recessed securement means formed to the shape of the fastener nut for holding each fastener nut in place when tightening each fastener bolt used to secure the tray to the steering column.

4. The tray according to claim 2, further comprising:
at least one drain hole at a bottom of the hollow portion.

5. The tray according to claim 2, further comprising:
a removable cover on the bottom wall portion of the tray for gaining access to the hollow recessed portion for the installation or removal of the fasteners.

6. The tray according to claim 1, further comprising:
at least one drink holder means attached to an external wall surface of one of the front wall portion, the pair of side wall portions and combinations thereof.

* * * * *